Jan. 30, 1934.   P. A. ROBBINS   1,945,378
TEMPERATURE INDICATING DEVICE
Filed Aug. 3, 1931
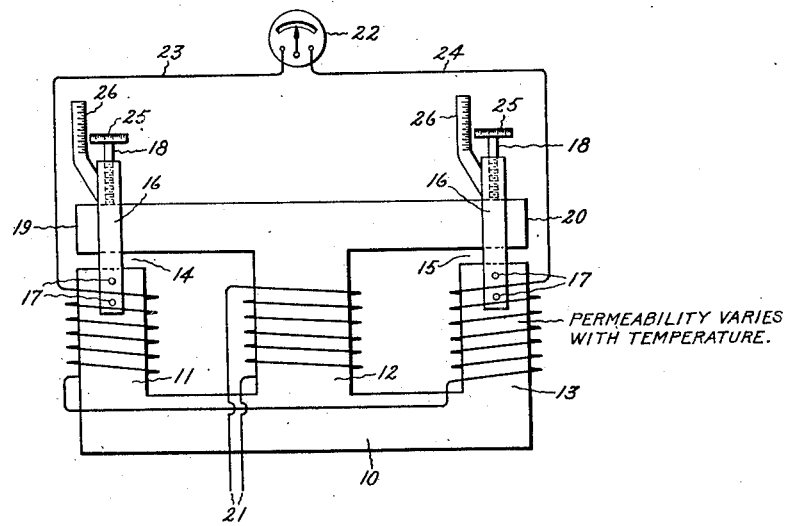
Inventor:
Percy A. Robbins,
by Charles E. Tullar
His Attorney.

Patented Jan. 30, 1934

1,945,378

UNITED STATES PATENT OFFICE 1,945,378

TEMPERATURE INDICATING DEVICE

Percy A. Robbins, Lynn, Mass., assignor to General Electric Company, a corporation of New York Application August 3, 1931. Serial No. 554,820

7 Claims. (Cl. 73—32)

The present invention relates to temperature indicators and has for its principal object the indication of temperatures at a distance. Other and further objects will be apparent from the description.

In accordance with the invention the changes in magnetic properties of certain materials with variations in temperature are utilized as an indication of temperature. In one form of the invention a magnetic core symmetrical in shape is composed in part of temperature sensitive magnetic material. Changes in temperature are detected by the unbalance produced in an electrical circuit composed of coils wound symmetrically upon the core and connected in opposition.

The features of my invention which are believed to be novel and patentable are pointed out in the claims appended hereto. For a better understanding of the invention reference may be had to the accompanying drawing.

In accordance with the embodiment of the invention illustrated by the drawing a laminated core may be provided having three legs 11, 12, and 13, and air gaps 14 and 15 either or both of which may be adjustable.

Any suitable means for adjusting the air gaps may be employed. They may, for example take the form of U-shaped straps 16 of non-magnetic material fastened to the legs 11 and 13 by means of non-magnetic units 17, and provided with adjusting screws 18 bearing against the upper surface of portions 19 and 20 of core 10. The air gaps are decreased by rotating the screws 18 to move in the downward direction, and the resiliency of the core is relied upon to increase the air gaps when the screws 18 are released.

The leg 13 is composed of a temperature sensitive alloy. For example, a copper-nickel alloy such as described in United States Patent No. 1,706,172, March 19, 1929 Kinnard which has a negative temperature coefficient of permeability may be used. The remainder of the core may be composed of transformer iron. An alternating magnetic flux is induced in the middle leg 12 by its winding which is connected to a source of alternating current 21. The flux flowing through leg 12 divides and returns through the outer legs 11 and 13. The reluctances of the alternate paths determine the proportionate amounts of flux carried by each of the outer legs. The outer legs 11 and 13 are provided with windings connected in opposition and form a closed circuit through the electrical measuring instrument 22 and connecting leads 23 and 24. Means are provided for adjusting either or both of the air gaps 14 and 15 to vary the relative reluctances of the flux paths through legs 11 and 13. If the reluctances are made equal at any given temperature, the fluxes cutting the windings 11 and 13 will be equal, so that, assuming the number of turns on these windings are equal, equal and opposite voltages will be induced in said windings and no current will flow in the meter 22. Any change in the temperature of the leg 13 will change the reluctance of the flux path through that leg and consequently unbalance the electrical circuit, giving an indication in the meter 22. It is apparent that the device is independent of ordinary variations in voltage of the source of supply.

The instrument 22 may be calibrated to read directly the temperature of the magnetic circuit, or the meter 22 may be used as a null instrument to indicate temperature deviations only, and the air gap adjusting means 16 may be calibrated by means of the micrometer heads 25 and cooperating scales 26, for example, to indicate temperatures corresponding to magnetic balance. It is apparent that temperature indications may be obtained at a point remote from that at which the temperature is to be measured. Although I have shown an unbalance responsive device 22 of the indicating type it will be understood that the device 22 may also take the form of a contact making device, or of any other suitable device responsive to unbalance of the circuit, or may for control purposes, be directly interposed in the circuit of a temperature adjusting means.

Although I prefer to employ a magnetic core possessing a substantial symmetry of shape, my invention obviously includes unsymmetrical cores in which the magnetic balance is obtained by a suitable change in the air gap, dimensions of the iron or relative numbers of turns of the coils on legs 11 and 13.

Although for many applications the presence of an air gap in at least one of the legs may be an advantage in that it tends to stabilize the flux, my invention obviously also includes devices in which the air gap is eliminated, and the desired magnetic constants are obtained by appropriate dimensioning of the iron.

In accordance with the provision of the patent statutes I have described the principle of operation of my invention together with the apparatus which I now consider to be the best embodiment thereof, but I desire to have it understood that the apparatus shown is only illustrative and that the invention may be carried out by other means.

What I claim as new and desire to secure by Letters Patent of the United States, is:

1. A temperature responsive device comprising a magnetic core, one portion of which is composed of temperature sensitive magnetic material and another portion of which is composed of magnetic material relatively insensitive to temperature, electrical windings thereon, including an exciting winding, and secondary windings connected in opposition, only one of which is in inductive relation with the temperature sensitive portion of the magnetic core, and an electrical instrument connected in the circuit of said secondary windings.

2. A temperature responsive device comprising a magnetic core, having a center leg and outer legs acting as parallel return paths for the magnetic flux in the center leg, only one of said outer legs being composed of a temperature sensitive material, an exciting winding setting up a magnetomotive force in the center leg, opposed secondary windings threaded respectively by the flux flowing in said parallel return paths, and electrically connected thereto a device responsive to the difference between the voltages induced in said secondary windings.

3. In combination a magnetic core, an exciting winding, secondary windings, one of which links a portion of the flux in the magnetic circuit, the other of which links another portion of the flux in the magnetic circuit, means comprising temperature responsive magnetic material constituting only one portion of said magnetic core, for causing the relative amounts of flux linked by said secondary windings to depend upon temperature, and means responsive to the difference in said flux linkages to provide a response to temperature variations.

4. In combination a magnetic core providing parallel magnetic circuits, at least one of which has an adjustable air gap therein, means for adjusting said air gap, one but not all, of said parallel circuits including temperature sensitive magnetic material, causing the division of flux between said circuits to change with temperature, an exciting winding linking said parallel magnetic circuits, and means responsive to relative variations in the fluxes of said parallel magnetic circuits to provide a response to temperature variations.

5. In combination a magnetic core providing parallel magnetic circuits having adjustable air gaps therein, means for adjusting said air gaps, one, but not all, of said circuits including temperature sensitive magnetic material causing the division of flux between said circuits to change with temperature, an exciting winding linking said parallel magnetic circuits, secondary windings each linking one of said circuits, and having voltages induced therein, dependent upon the relative quantities of flux in said circuits, and means responsive to the difference in said induced voltages to provide a response to temperature variations.

6. In combination, a magnetic core providing parallel magnetic circuits, at least one, but not all, of which include temperature sensitive magnetic material, causing the division of flux between said circuits to change with temperature, an exciting winding linking said parallel magnetic circuits, and means responsive to relative variations in the fluxes of said parallel magnetic circuits to provide a response to temperature variations.

7. In combination, a magnetic core having portions providing a plurality of magnetic paths, at least one, but not all, of which include temperature sensitive magnetic material, thereby causing the relative quantity of magnetic flux in various portions of said core to vary with temperature, means for magnetizing said core, and means responsive to relative variations in magnetic flux in the portions of said core to provide a response to temperature variations.

PERCY A. ROBBINS.